Patented Feb. 24, 1953

2,629,729

UNITED STATES PATENT OFFICE 2,629,729

HYDROCARBON SYNTHESIS

Edwin T. Layng, New York, N. Y., assignor to Hydrocarbon Research, Inc., New York, N. Y., a corporation of New Jersey No Drawing. Application December 19, 1946, Serial No. 717,313

2 Claims. (Cl. 260—449.6)

The present invention relates to the synthesis of hydrocarbons and oxygenated hydrocarbons, particularly those having a molecular weight greater than that of carbon monoxide, by the catalytic reduction of carbon monoxide with hydrogen in the presence of a catalyst in fluid condition.

In accordance with the present invention, an iron catalyst is maintained in a condition of dense phase fluidization by the upflowing reactants which make predetermined contact with the catalyst under selected operating conditions, including a temperature within the optimum operating range. The stream of reactant gases comprises carbon monoxide and hydrogen with or without other typical additions, in suitable proportions, and the effluent products are withdrawn from contact with the catalyst after conversion of a major portion of the carbon monoxide, but while they still contain not less than about 1% and preferably not less than about 2% of carbon monoxide, expressed on the molar basis. In short, it has been discovered that where the reaction is carried materially beyond a point where there is at least about 1 mol percent of carbon monoxide in the effluent products, fluidization is impaired and the process tends to become economically impractical.

On the other hand it is usually advantageous to carry the reaction to a level of conversion approximating this lower limit since at higher concentrations of carbon monoxide the reaction goes forward rapidly and without undesirable effect on the catalyst or product distribution. Thus, while it is necessary to withdraw reaction products before the carbon monoxide concentration has fallen below about 1% and preferably before it has fallen below about 2%, best results are obtained by a close approach to this limit of about 2% or, at most, 3% of carbon monoxide on a molar basis.

More specifically, it has been discovered that the fluidized catalyst in question must maintain more or less uniform fluidizing characteristics if good and consistent fluidization is to be held over any reasonable period on stream under reasonably constant reaction conditions. Thus for any predetermined contact between a feed gas and a fluidized catalyst mass of selected depth and character, the catalyst must not vary materially in respect to its optimum settling rate or kindred physical characteristics. Otherwise fluidization may be impaired or unfavorably altered. Where the settling rate of the catalyst increases, the mass tends to become relatively more dense at any predetermined upflow of reactant gases. On the other hand, with the more frequently encountered decrease in settling rate, the catalyst tends to become progressively more and more aerated at a fixed rate of reactant feed until ultimately it will tend to fill the reactor and pass out with the products of reaction. This difficulty, which has been hitherto experienced in the case of typical catalysts operating at relatively high temperatures, has been referred to as loss of the catalyst bed and obviously presents a serious impediment to the economic operation of the otherwise highly advantageous production of hydrocarbons in the presence of a fluid contact mass.

In accordance with the present invention, it has further been discovered that loss of catalyst bed and the related progressive variation from initial, optimum operation of the process can be overcome by terminating the reaction; that is, by withdrawing the gasiform reaction effluent from contact with the catalyst, while containing at least about 1 and preferably not less than about 2 mol percent of carbon monoxide. At ranges of carbon monoxide content materially lower than the foregoing, the gasiform reactants so carbonize the catalyst as to cause a lowering of overall catalyst density. Presumably, under such conditions there is a progressive formation of a relatively light or low density carbon on and about the particles of catalyst which progressively reduces the apparent catalyst density and accordingly the settling rate, until ultimately the entire mass tends to become excessively aerated by the flow of reactant gases and pass partly or completely out of the reactor.

While it is to be understood that the foregoing explanation is purely theoretical and conjectural and not intended as a limitation herein, nevertheless when operating in accordance with the present invention, it is possible to maintain the catalyst at, or reasonably approximating, predetermined conditions of density and settling rate over protracted periods of operation. On the other hand, in one case, for example, an iron catalyst having an initial fluidized density in the neighborhood of 70 lbs. per cubic foot after a comparable, extended period of fluid operation with a reaction effluent having a carbon monoxide concentration substantially less than 1 mol percent, will have a fluidized density of 20 lbs. per cubic foot where the linear velocity of the upflowing, fluidizing gases remains constant.

While the present invention is, in its broadest sense, applicable to the treatment of feed gases containing carbon monoxide and hydrogen in varying proportions, nevertheless in accordance with the preferred embodiment it is advantageous to operate with a total reactor feed of certain preferred characteristics. For example, best results are secured where the total mol percentage of carbon monoxide in the feed is not substantially greater than about 15% of the total gas feed entering into contact with the catalyst. As will be obvious from the foregoing, the reactant feed will necessarily contain an amount of carbon monoxide in excess of the minimum requisite in the reactor effluent and preferably not less than about 5% on the molar basis.

In view of the frequent occurrence of water vapor in hydrogen-carbon monoxide feed gases of the present character, it is pertinent to point out that the water vapor content of the feed gas should advantageously be as low as possible; in any event not greater than 3% on a molar basis but preferably as low as can be attained by condensation and separation at, for example 70 to 90° F., and at pressure of about 200 lbs. per square inch gauge; in other words, about 0.01% to 0.1%.

Moreover, the preferred total feed composition includes a molar proportion of hydrogen to the carbon monoxide substantially greater than 2.5:1. In short, the mol ratio of $H_2:CO$ is advantageously well above 2.5:1, preferably above about 3:1, as for example 4:1, 5:1 or higher.

The reactant feed desirably comprises a substantial proportion, preferably upwards of about 15%, of carbon dioxide, which tends to control the reaction by suppressing net formation of carbon dioxide and which permits a lower hydrogen to carbon monoxide ratio in the reactant gases with the result that the production of light gaseous hydrocarbons such as methane and ethane is decreased. Obviously excessive production of the latter gases may be quite disadvantageous when operating for the production of normally liquid hydrocarbons. Moreover the net production of carbon dioxide usually, beyond reasonable limits, represents an uneconomical utilization of carbon.

The remainder of the gaseous feed, if any, best comprises gases which are inert or which at least do not tend to impair the course of the reaction. Thus even when operating with relatively pure reactant gases, the feed may contain normally gaseous hydrocarbons. This is particularly true in the case where a portion of the total reactant feed, at least, comprises product gases recycled from the effluent of the reactor.

The recycle of preferably normally gaseous reaction products is of advantage in that it readily permits maintenance of the optimum conditions defined above in connection with the composition of the total feed, affords a ready source of desired carbon dioxide for the feed, and permits return of the normally gaseous hydrocarbons to the reaction zone where unsaturated gases tend to be consumed in the course of the reaction.

Operation of the process with a feed gas meeting the requirements of the preferred embodiment has numerous practical advantages. Thus in addition to suppression of carbon dioxide and methane formation the process enables the efficient production of predominantly liquid hydrocarbons in the motor gasoline boiling range with an iron type of catalyst.

In a typical operation at a temperature of 650° F. and a pressure of 200 pounds per square inch gauge, and with a reactor feed containing about 65% of hydrogen, about 32% of carbon monoxide, and about 1% of carbon dioxide in a total volume theoretically sufficient to produce one barrel of liquid hydrocarbons, the carbon monoxide concentration will fall to about 2% when only 0.7 of a barrel of oil has been synthesized. To carry the reaction further entails the disadvantages of forcing a reaction at extremely low reactant concentration as well as the aforementioned deposition of light elemental carbon on the catalyst. Moreover the effluent withdrawn at this stage may comprise almost 28% $CO_2$ representing a loss of carbon monoxide to an undesired by-product.

Under the same conditions but with about 20% of carbon dioxide, a carbon monoxide content well below 15% and a hydrogen carbon monoxide ratio of over 3:1, there is usually no or only a negligible net production of carbon dioxide. Moreover, the carbon monoxide consumed is converted predominantly to desired liquid hydrocarbons.

In accordance with one illustrative example, a typical fluid reactor is provided with a charge of iron catalyst comprising substantially pure iron powder into which about 1.0% of potassium oxide ($K_2O$) and about 2% alumina ($Al_2O_3$) have been incorporated as promoters. The catalyst powder all passes a 200 mesh screen with about 85% passing a 325 mesh screen. The latter fraction has a particle size distribution of fairly broad range.

The feed gas comprises about 30.6% carbon monoxide and about 64.3% hydrogen, the remainder being carbon dioxide, methane and a very small proportion of nitrogen. The reactor is maintained at an internal operating temperature of 650° F. and a pressure of 250 pounds per square inch. During operation the aforementioned temperature is controlled by appropriate cooling surfaces immersed in the reaction zone.

The feed gas is passed upwardly through the mass of catalyst at a linear gas velocity of 1.2 feet per second sufficient to maintain the powdered contents in a state of uniform dense phase fluidization.

The level of catalyst in the reactor is adjusted so that the effluent gases withdrawn from contact with the catalyst contain about 2.3% carbon monoxide, on the molar basis.

The fresh catalyst is first subjected to a period of conditioning by passing in fresh feed gas, under the foregoing conditions, for a period of about 2 days until settled operaion has been reached with a constant yield of liquid hydrocarbons. At this time the fluidized density of the catalyst is between 40 and 45 pounds per cubic foot. Thereafter operation is continued, the gaseous products of reaction being withdrawn from the upper surface of the catalyst, separated from entrained solid particles in a cyclone separator, and subjected to condensation and separation at a temperature of about 70° F. and a pressure of 250 pounds per square inch gauge yielding a liquid hydrocarbon layer corresponding to about 65% of the carbon monoxide consumed. About 60% of this hydrocarbon layer comprises products boiling in the motor gasoline range. Operating in this manner, contact time is approximately 25 seconds.

It is particularly significant to note that the bed of catalyst remains fairly constant at a fluidized density of between 40 and 45 pounds per cubic foot over an operating period of four hundred hours.

In accordance with a parallel example carried out under the same conditions, except that the bed depth and contact time is substantially increased so that the effluent reactor stream contains only about 0.7% carbon monoxide by volume, there is a material decrease in catalyst bed density. More specifically, within a period of operation of only 200 hours, the fluidized bed density is decreased progressively to about 25 pounds per cubic foot. Moreover, the mass of catalyst smells more or less inversely to its decrease in density and the overall yield of hydrocarbons boiling in the motor gasoline range decreases quite materially.

In accordance with another example, otherwise the same as the foregoing, a portion of the effluent reaction products, after condensation and separation of the normally liquid compounds, are recycled to the incoming fresh feed and passed through the reactor in admixture therewith at a linear velocity of 1.2 feet per second, in the ratio of about 1:1, and the reactor effluent withdrawn at carbon monoxide concentration of about 2 mol percent. The catalyst density similarly remains at 40–45 pounds per cubic foot after 400 hours of operation. The recycle feed is relatively rich in hydrogen and light gaseous hydrocarbons and contains a material proportion of carbon monoxide greater than the carbon monoxide content of the fluid reactor effluent gases by virtue of separation of the normally liquid constituents. Obviously, with a feed of this type therefore, the total feed will contain a smaller proportion of hydrogen and carbon monoxide than in the previous example, the feed including, for example approximately the following: about 14% CO; about 20% $CO_2$; about 35% hydrogen; the remainder being the aforementioned diluents.

Obviously the carbon monoxide content in the effluent stream from the reactor is dependent upon a number of factors including the type of catalyst, reaction conditions, contact time and feed composition. Essentially, however, with any given reactor under predetermined conditions of reaction, the carbon monoxide content of the effluent reactor products is determined by contact time which in turn depends on such factors as the rate at which the gases pass through the reactor, and the depth of the catalyst bed. While the linear internal rate of gas flow may usually be varied somewhat without adversely affecting the operation nevertheless for any substantial regulation of contact time, it is usually superior to select an appropriate catalyst bed depth usually by appropriate experiment.

The invention accordingly contemplates withdrawal of reactor effluent after a substantial portion, preferably a major portion, of the carbon monoxide in the feed has been converted but before the carbon monoxide content of the effluent has fallen below about 1%, preferably before below about 2.0%. Advantageously the operation is controlled to obtain a carbon monoxide conversion equal to at least 85% and usually 90–95% of the carbon monoxide in the fresh feed, the yield of $C_3$ and heavier hydrocarbons corresponding to 75–80% of the converted carbon monoxide.

The present invention may utilize catalysts containing any typical modifying agents in the usual proportions. Such, for example, are the so-called activating and promoting additions of the type exemplified by titanium oxide, alkali metal oxides, alkaline earth metal oxides, alumina, zirconia and many others. The specific modifying agent and the proportion in which it is included in the catalyst, per se, form no part of the present invention and may follow conventional practice. On the other hand it has been found that best results are obtained where a substantial proportion, as for example, 1 to 2% of an alkali metal modifier, such as potassium carbonate, is present in the catalyst.

So also, it is important to note that the particular temperatures and pressures of operation are apparently fully independent of the present invention and may follow the typical procedure in the art. In other words, temperatures and pressures will be characteristic of those optimum for the particular catalyst selected and the predominant product desired. For a typical iron catalyst temperatures will usually vary from about 550–700° F. at pressures above atmospheric, preferably at about 200 to 300 pounds per square inch gauge.

In general, reference above to hydrocarbons may be considered as applicable to the usual products of the reduction of carbon monoxide by hydrogen, including not only petroleum hydrocarbons but also oxygen-containing compounds, such as the numerous aliphatic alcohols, organic acids, ketones, aldehydes and the like, which may be produced by the present process. As is known, predominantly liquid hydrocarbons result from operations carried out with typical iron catalysts, under the reaction conditions indicated in the above example. At lower temperatures, somewhat higher molecular weight compounds tend to result while at higher temperatures the trend is toward gaseous hydrocarbon products. Predominantly oxygenated compounds tend to be produced at higher operating pressures.

Obviously many modifications and variations of the invention as hereinbefore set forth may be made without departing from the spirit and scope thereof and only such limitations should be imposed as are indicated in the following claims.

I claim:

1. In the synthesis of hydrocarbons, oxygenated hydrocarbons and mixtures thereof by the catalytic reduction of carbon monoxide with hydrogen wherein a stream of synthesis gas comprising hydrogen and carbon monoxide is passed upwardly in contact with a solid particle, iron hydrocarbon synthesis catalyst at a temperature in the range of about 550–700° F. and at a linear velocity such that the catalyst particles are maintained in a state of dense phase fluidization with a predetermined upper interface from which the effluent reaction product stream is continuously withdrawn, the improvement of maintaining high yields of the desired products of reaction under conditions suppressing the decrease in catalyst particle density and the resulting loss of catalyst bed due to deposit of low density carbon on the catalyst particles, by introducing a synthesis gas comprising hydrogen and carbon monoxide in a relative molar ratio at least 2.5:1 and containing at least 15 mol percent carbon dioxide into contact with the fluidized catalyst, maintaining said gas in contact with said fluidized catalyst until a predetermined portion of the carbon monoxide is converted into said desired products of reaction, withdrawing the reactant gas stream from said upper interface of the catalyst when the remaining unconverted carbon monoxide contained therein is in the range of about 2–3% by volume of the withdrawn stream, and recovering desired products of reaction from the withdrawn stream.

2. The method according to claim 1 wherein the catalyst particle density is maintained above about 40 pounds per cubic foot.

EDWIN T. LAYNG.

REFERENCES CITED

The following references are of record in the file of this patent:

UNITED STATES PATENTS

| Number | Name | Date |
|---|---|---|
| 2,159,077 | Duftschmid et al. | May 23, 1939 |
| 2,251,554 | Sabel et al. | Aug. 5, 1941 |
| 2,279,052 | Michael et al. | Apr. 7, 1942 |
| 2,301,687 | Dorschner | Nov. 10, 1942 |
| 2,393,909 | Johnson | Jan. 29, 1946 |
| 2,434,537 | Barr et al. | Jan. 13, 1948 |
| 2,436,957 | Eastman | Mar. 2, 1948 |
| 2,438,584 | Stewart | Mar. 30, 1948 |
| 2,451,879 | Scharmann | Oct. 19, 1948 |
| 2,464,505 | Hemminger | Mar. 15, 1949 |
| 2,472,501 | Sweetser | June 7, 1949 |
| 2,510,096 | Frankenburg et al. | June 6, 1950 |

FOREIGN PATENTS

| Number | Country | Date |
|---|---|---|
| 6,476 | Great Britain | Dec. 10, 1914 |

OTHER REFERENCES

Chem. and Met. Eng., vol. 53, pp. 220, 222, 224 (Jan. 1946).